UNITED STATES PATENT OFFICE.

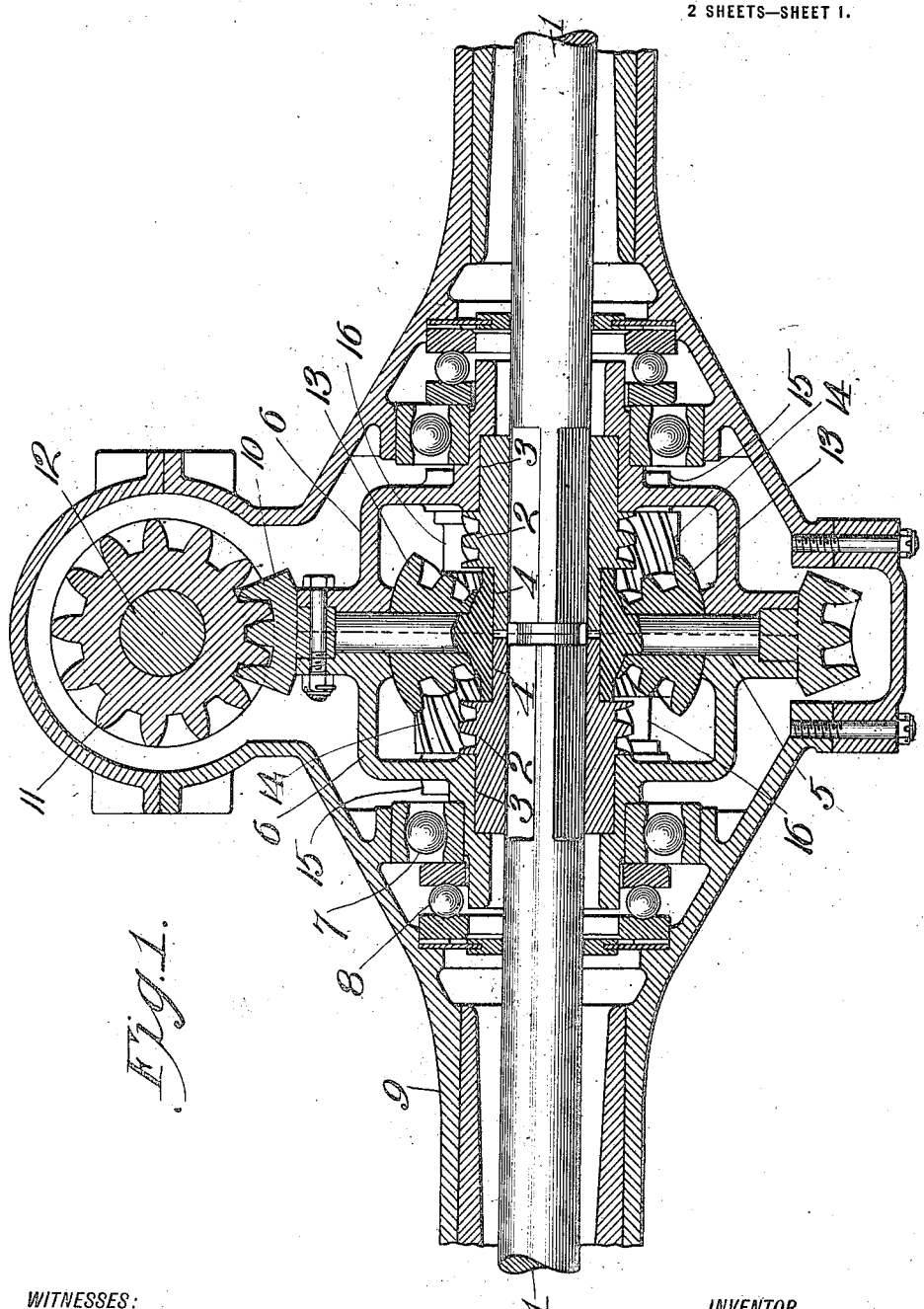

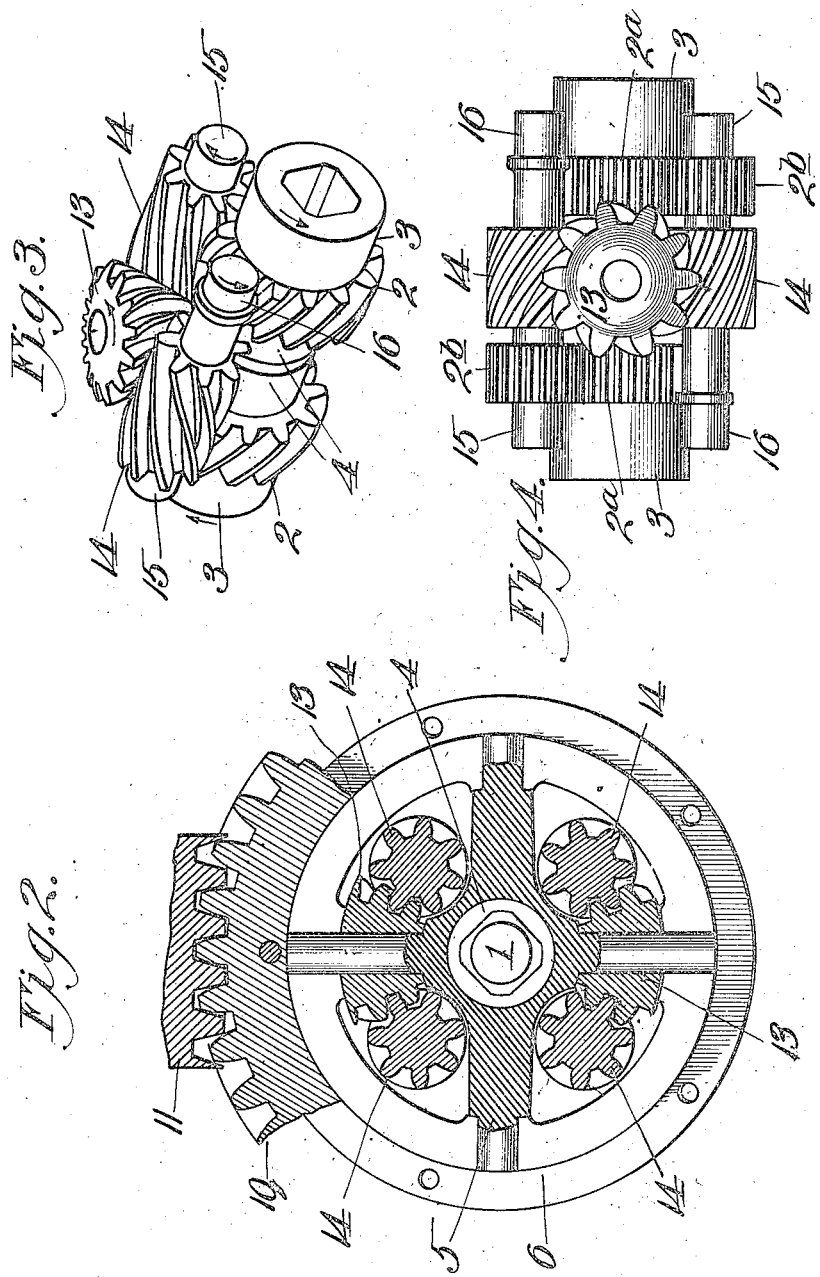

AN DOR T. NOGRADY, OF KANSAS CITY, MISSOURI, ASSIGNOR, BY DIRECT AND MESNE ASSIGNMENTS, TO DOUBLE DRIVE DIFFERENTIAL COMPANY, OF KANSAS CITY, MISSOURI, A CORPORATION OF MAINE.

DIFFERENTIAL GEARING FOR AUTOMOBILES.

1,140,312.      Specification of Letters Patent.      Patented May 18, 1915.

Application filed August 3, 1914. Serial No. 854,770.

*To all whom it may concern:*

Be it known that I, AN DOR T. NOGRADY, a citizen of the United States, residing at Kansas City, in the county of Jackson and State of Missouri, have invented certain new and useful Improvements in Differential Gearing for Automobiles, of which the following is a specification.

This invention relates to motor propelled vehicles and more especially to differential gearings of that class wherein the power developed by the motor is applied to drive wheels at both sides of the vehicle at all times while permitting the wheels to differentiate to accommodate turning movements or the rotation of a jacked-up wheel in lubricating or other operations, and my special object is to produce differential gearing of the character outlined possessing advantages in point of strength, durability, compactness and cheapness of construction.

To this end the invention consists in certain novel and peculiar features of construction and organization as hereinafter described and claimed; and in order that it may be fully understood reference is to be had to the accompanying drawings, in which—

Figure 1, is a central vertical section of a differential gearing embodying my invention. Fig. 2, is a central transverse section thereof, with certain parts broken away and other parts in the background omitted. Fig. 3, is a detailed perspective view illustrating the relation of the wheels of the gearing and one of the two directions in which they turn in differentiating. Fig. 4, is a top view of a modified form of the mechanism illustrated in Fig. 3.

In the said drawing, 1—1 are the sections of an axle for use on an automobile, and non-rotatably secured on the inner ends of the axle sections are gear wheels 2 which gears may be spiral gears as shown in Figs. 1 to 3 inclusive or ordinary straight gears as indicated at 2ª in Fig. 4, it being also understood that the spiral gears may be either of the right or left hand type but that they should both be either right hand or left hand gears.

The gears 2 and 2ª are provided with smooth outer ends 3 and smooth inner ends 4, the inner ends being preferably of reduced diameter.

5 is a cross-shaped frame arranged vertically between the toothed portions of the said gears 2 and journaled on the portions 4 thereof, so as to be capable of rotation independent of either or both of said gears. The outer ends of the frame are clamped firmly between the adjacent edges of a pair of horizontally arranged cups 6 which conjointly form a closed hollow casing and the hub portions of the cups are journaled on the portions 3 of the gears 2 as shown clearly in Fig. 1. Any suitable bearings such as the ball bearings 7 and 8 may be employed between the hollow casing composed of said cups and the housing 9 for the axle sections 1. No claim to the special antifriction devices employed is made.

Clamped to and between and arranged circumferentially of the cups 6, is a master gear 10, shown in this instance as of the spiral toothed type, and meshing with a worm 11 mounted on the drive shaft 12 of the engine.

Journaled on diametrically opposite arms of the cross-shaped frame 5, is a pair of conical spiral toothed gear wheels 13, each meshing at opposite sides with spiral gears 14, one of each pair of which mesh with one of the gears 2, while the other of each pair of gears 14 mesh with the other gear 2; it being noted by reference particularly to Figs. 1, 3 and 4, that the opposite ends of gears 14 terminate in short and long spindles 15 and 16 respectively, this arrangement being resorted to so that each gear can be journaled in what may be termed the outer walls of the casing composed of the cups without conflict with the gear wheels 2 with which they are not engaged, that is to say by providing each gear 14 with a long spindle 16, such spindle can extend past the gear 2 with which it should not engage in order to reach and be journaled in the outer wall of the said casing as clearly shown, and in this connection by reference to Fig. 2, particularly, it will be seen that by using a cross-shaped frame and mounting inwardly tapering conical gears thereon, it is possible to arrange gears 14 with their axes at about the same distance from the axis of the axle sections 1, as the centers of the conical gears—in other words by the use of the cross-shaped frame and the inwardly tapering conical gears it is possible to arrange the engaging gears very compactly and thus employ gears 2 of smaller diameter without sacrificing strength and durability.

In Fig. 4, I show a modified construction in that straight gears 2ª are substituted for the spiral gears 2, and mesh with straight pinions 2ᵇ rigid with the spiral gears 14, which in this instance are short gears, each of the gears 2ᵇ meshing with different gears 2ª and therefore the construction in Fig. 4 has the same mode of operation and result as the construction shown in the preceding figures.

Assuming that the differential gearing described is mounted upon a motor car, it will be apparent that as long as the car travels in a direct line, the power from the engine will be applied equally upon both of the axle sections, because the rotation imparted to the casing carrying the cross-shaped frame is transmitted by the conical gears 13 directly to the spiral gears meshing with and disposed at opposite sides of the same, it being understood that as long as this action continues there will be no rotation of gears 13 and 14 around their own axes, and this friction lock between the gears 13 and 14 while sufficient to propel the car permits of differentiation when necessary through unequal travel of the gear wheels on the axle sections, which unequal travel may be incident to running over uneven roads, but generally occurs when a car is caused to change its direction of travel, as in such case the speed of the outside wheel must increase in proportion to the radius of the turn.

Assuming that the car is making a turn whereby the wheel on axle section carrying the right hand gear wheel 2 of Fig. 3 accelerates in speed, it will be seen that differentiation will occur, that is to say, the straight spiral gear wheel 2 will turn in the direction indicated by the arrow thereon, and thus turn the engaged wheel 14 in the direction indicated by the arrow upon the same, and said wheel will in turn transmit rotation to wheel 13 as indicated by the arrow thereon and through said wheel to the other wheel 14 in the direction indicated by the arrow thereon and through the latter to the other wheel 2, which however, having frictional resistance with the ground does not accelerate but reacts to compel wheels 14 and 13 to planetate around gears 2. Because of this fact it is also clear that when one wheel is jacked up off the ground, it can be turned without imparting rotation to the companion wheel upon the ground.

From the above description it will be apparent that I have produced a differential gearing possessing the features of advantage enumerated as desirable in the statement of the object of the invention, and I wish it to be understood that while I have illustrated and described the preferred embodiment of the same, I reserve the right to make all changes falling within the spirit and scope of the appended claims.

I claim:

1. A differential gearing, comprising a master gear, a pair of alined axle sections, a radially arranged spiral gear rotatable with the master gear and also rotatable around its own axis, a pair of similar spiral gears meshing with and located at opposite sides of the radially arranged spiral gear and paralleling the axle sections, and gearing between said pair of spiral gears and said axle sections.

2. A differential gearing comprising a master gear, a pair of alined axle sections arranged centrally of the master gear, a pair of radially arranged spiral gears rotatable with the master gear and also rotatable independent thereof around their own axes, a pair of spiral gears meshing with each radial gear and located at opposite sides of the same and extending parallel with the axle sections, and gearing connections between one of each pair of said pairs of spiral gears with one of said axle sections and between the remaining gears of said pairs of spiral gears and the other axle section.

3. A differential gearing, comprising a pair of alined axle sections, a pair of gear wheels mounted thereon and rotatable therewith, a casing bearing a journaled relation to said gear wheels and inclosing the teeth thereof, a cross-shaped frame journaled on said gear wheels inward of the teeth thereof, and secured to said casing, inwardly tapering radially arranged spiral gear wheels journaled on said cross-shaped frame, a pair of spiral gear wheels paralleling the first-named gear wheels and each meshing with one of the latter, and with the opposite sides of one of the radially arranged gear wheels, and journaled in and carried by said casing, and a master gear wheel rigidly secured to said casing concentrically of the axis thereof.

In testimony whereof I affix my signature in presence of two witnesses.

ANDOR T. NOGRADY.

Witnesses:
  H. C. RODGERS,
  G. Y. THORPE.